United States Patent
Kovacs

(10) Patent No.: US 7,770,515 B2
(45) Date of Patent: Aug. 10, 2010

(54) FRYING VESSEL FOR DEEP FRYER APPARATUS

(76) Inventor: Laszlo Kovacs, Normafa u. 49-51., H-1121, Budapest (HU)

(*) Notice: Subject to any disclaimer, the term of this patent is extended or adjusted under 35 U.S.C. 154(b) by 883 days.

(21) Appl. No.: 10/585,034

(22) PCT Filed: Dec. 17, 2004

(86) PCT No.: PCT/HU2004/000121
§ 371 (c)(1), (2), (4) Date: Jul. 20, 2006

(87) PCT Pub. No.: WO2005/063099
PCT Pub. Date: Jul. 14, 2005

(65) Prior Publication Data
US 2009/0013878 A1    Jan. 15, 2009

(30) Foreign Application Priority Data
Dec. 31, 2003    (HU) ................... 0304122

(51) Int. Cl.
A47J 37/12    (2006.01)
A47J 27/00    (2006.01)
(52) U.S. Cl. .................... 99/407; 392/441
(58) Field of Classification Search .............. 99/407, 99/403–418, 275–283, 326–331; 392/441–502
See application file for complete search history.

(56) References Cited

U.S. PATENT DOCUMENTS

| 3,776,126 | A | * | 12/1973 | Veeneman et al. ............ 99/404 |
| 4,205,600 | A | * | 6/1980 | Garrett .................... 99/341 |
| 4,505,194 | A | * | 3/1985 | Bishop et al. ............... 99/336 |
| 5,721,001 | A | * | 2/1998 | Ishikura et al. ............. 426/438 |
| 5,759,601 | A |   | 6/1998 | Kovács |
| 5,782,164 | A | * | 7/1998 | Brintle .................... 99/330 |
| 5,974,951 | A |   | 11/1999 | Kovács |
| 6,182,561 | B1 | * | 2/2001 | Garner et al. ............... 99/408 |
| 6,363,840 | B1 |   | 4/2002 | Song |

FOREIGN PATENT DOCUMENTS

| CN | 2476237 Y | 2/2002 |
| DE | 199 07 072 | 8/2000 |
| EP | 0 682 903 | 11/1995 |

* cited by examiner

Primary Examiner—Daniel Robinson
(74) Attorney, Agent, or Firm—Jordan and Hamburg LLP

(57) ABSTRACT

Frying vessel for a deep fryer apparatus, the frying vessel is closed with a bottom part from the bottom and with side wall from the side, a substantially horizontally formed electric heating element which is immersed in the frying oil and is in direct contact with the same is placed within the vessel, and at the bottom part of the vessel an outlet is provided. The bottom part of the vessel comprises a downwardly narrowing funneled portion, and the outlet is formed in the funneled portion.

3 Claims, 3 Drawing Sheets

FRYING VESSEL FOR DEEP FRYER APPARATUS

BACKGROUND OF THE INVENTION

The invention relates to a frying vessel for a deep fryer apparatus, where the frying vessel is closed with a bottom part from the bottom and with side wall from the side, a substantially horizontally formed electric heating element for being immersed in the frying oil and for being contact with the same is placed within the vessel, and at the bottom part of the vessel an outlet is provided for draining off at least the used frying oil.

In the technology of the food industry there are known methods for deep fat frying, especially for frying different kinds of food stuff in hot frying oil, when the frying oil is filled in a container which is at least closed from the bottom and the oil in the container is kept on appropriate temperature by means of an electric heating element, and the food stuff prepared for frying (e.g. potato, potato products, dough or different kinds of meat and meat products) is placed in the hot oil and is held there for a certain period of time. Examples of these methods especially for providing fried potato products are taught by the applicant of the present invention in U.S. Pat. No. 5,759,601 and U.S. Pat. No. 5,974,951. In these solutions a substantially horizontally positioned electric heating unit in direct contact with the frying oil is located in the lower part within the frying vessel. Generally, frying takes place above the heating unit when the product placed in a frying basket is immersed in the hot oil. In a preferred embodiment the bottom part of the frying vessel is equipped with an outlet which makes removal of the used exhaust oil possible. Then the vessel is refilled with fresh oil.

Irrespective of the benefits of the solutions proposed for controlling the process of frying a disadvantage of this method is that tiny pieces, fragments, crumbs, morsels etc. which unavoidably break off during frying settle and accumulate at the bottom of the vessel, and as they are very small they become burnt easily due to the relative nearness of the heating unit, thereby deteriorate the quality of the oil. Then the oil gets spoiled in a short time.

Usually, a pump is used for draining off and refilling of the oil. It means a further disadvantage since the pump as a mechanical machine part may get plugged with the oil containing the aforementioned small fragments, and especially when the apparatus is not used for a relatively long time, it may obstruct the pump to such an extent that it needs to be disassembled to make it ready for operation again.

SUMMARY OF THE INVENTION

The aim of the present invention is to provide an apparatus in which deterioration of the oil caused by the small burnt fragments can be eliminated, since these small burnt fragments can be removed in a simple manner without the need for a delicate piece of machinery as a pump. The invention on the one hand is based on the realization of the fact that the temperature of the oil (which under normal frying conditions gets mixed merely as a result of static convection of heat) measured at different height levels significantly decreases in a narrow range vertically under the operating heating element. At the same time, the temperature above the heating element is equalized which is necessary for good quality frying.

On the other hand, in the range under the heating element, most of the fragments falling off from above will automatically roll down to the bottommost point of the frying vessel if the bottom part of it is inclined. Thus they will get further from the heating element, and due to the rapidly decreasing temperature it will get burnt to a lesser extent. A further advantage is that collection and removal of these fragments from the frying oil will be easier. Finally, by circulating the oil in two directions and by blowing air from beneath, fragments which still get stuck can be broken up from the inclined bottom part.

In one example embodiment the frying vessel for a deep fryer apparatus according to the invention is a vessel provided with a bottom part having a downwardly narrowing funneled portion, and the outlet is formed in the funneled portion.

Further details and advantageous embodiments of the invention will now be described with reference to the accompanying drawings in which:

DETAILED DESCRIPTION OF THE INVENTION

Figure 1:
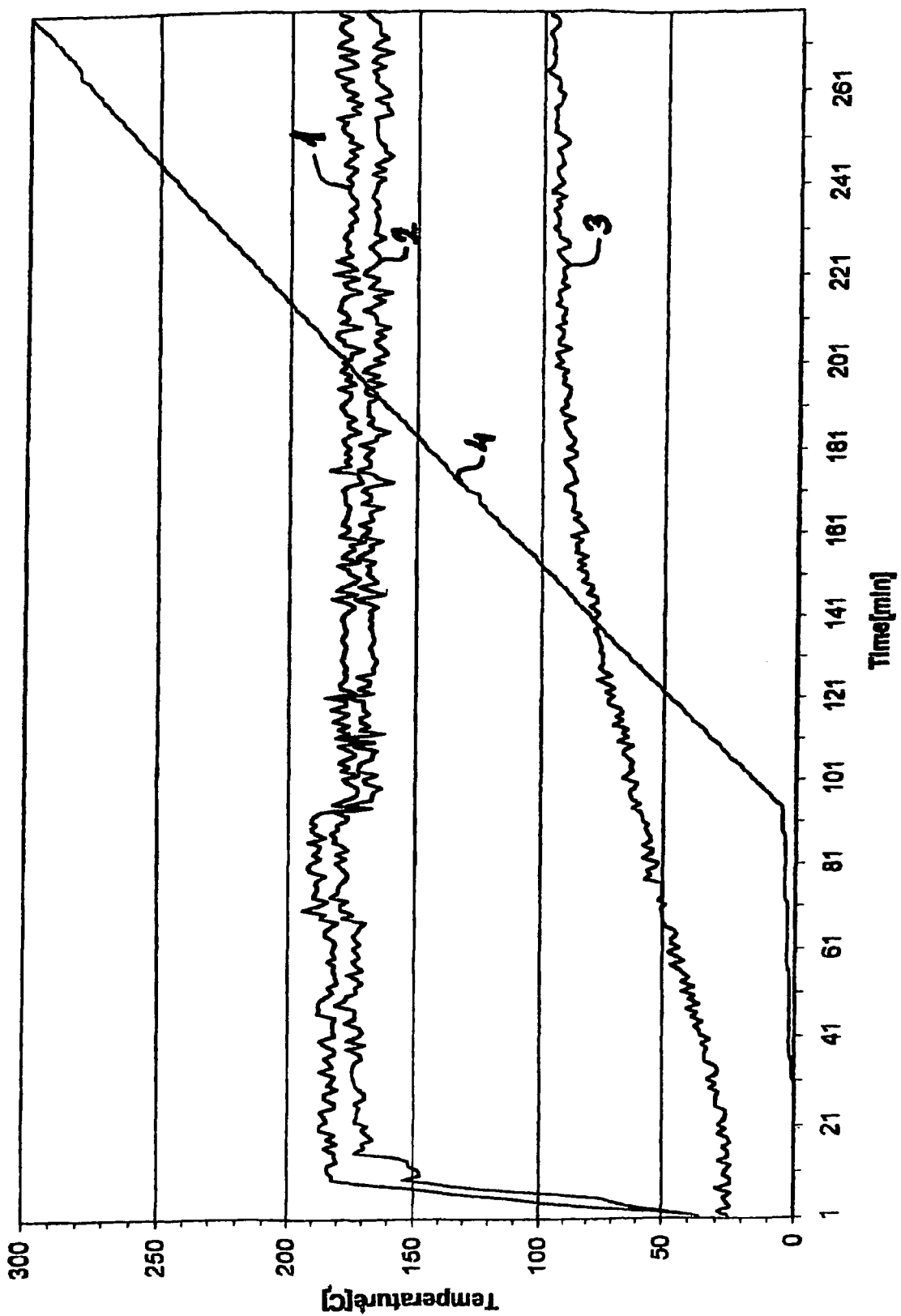
FIG. 1 is a diagram showing the change in temperature plotted against time when the deep fryer apparatus is filled with oil, the heating element is in operation and the temperature is measured at several points in different heights.

The diagram of FIG. 1 shows the change in temperature plotted against time when the heating element of a customary deep fryer apparatus is in operation and the frying vessel of the apparatus is filled with oil. Graph 1 shows the temperature measured (starting from switching on the apparatus) in the oil at a medium height above the heating element, graph 2 shows the temperature measured in the vicinity of the surface. Graph 4 shows the change in the temperature of the foodstuff placed in the oil in a frying basket at a later point of time. In the same diagram, graph 3 shows the temperature of the oil measured in the apparatus below the heating element. It is distinctly visible that graph 3 changes much more slowly than any of the others, and it becomes stable at a relatively low value.

Figure 2:
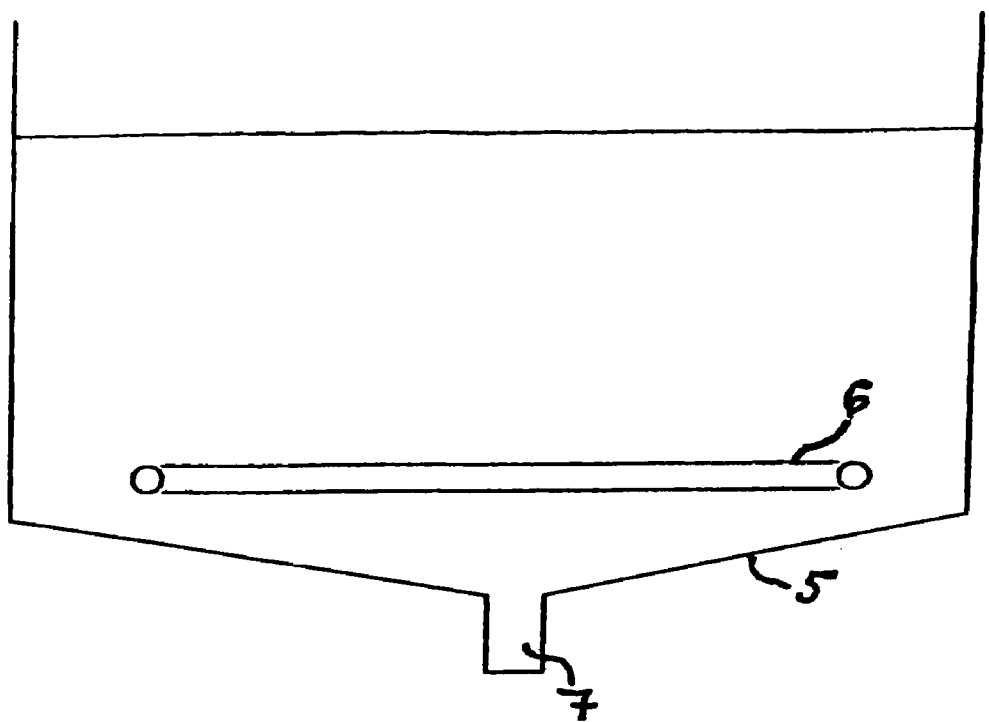
FIG. 2 is a schematic drawing of one embodiment of the frying vessel according to the invention.

In FIG. 2 an example embodiment of the frying vessel according to the invention is shown schematically. The frying vessel is closed at the sides by a wall and it has a bottom part which is formed differently from the conventional one. Within the frying vessel a horizontally shaped heating element 6 is located which is in direct contact with the frying oil and is typically operated by electric power. Supporting elements of the heating element 6 and means of the electric power supply are not shown. The bottom part is shaped as a downwardly narrowing funnel 5. An outlet 7 is formed at a lower part of the funnel 5. In this example the entire bottom part forms the downwardly narrowing funnel 5, however, it is possible to form this funnel only at a portion of the bottom part, the remainder may be for example flat, similarly to a conventional bottom design. Still, it is advantageous when at least the portion of the bottom part being directly below the essentially horizontally formed heating element 6 comprises the downwardly narrowing funneled portion 5.

Funneled portion 5 may be formed so that it is funnel-shaped in one dimension, for example when only two opposed inclined planes are used for the bottom part. Then outlet 7 forms a longitudinal channel, which also may be inclined. Funneled portion 5 may be formed so that it is funnel-shaped in two dimensions, and within this the bottom part may also be formed from plane surfaces, for example it may be pyramidal, or the vessel may be round, in which case funneled portion 5 is a cone.

Figure 3:
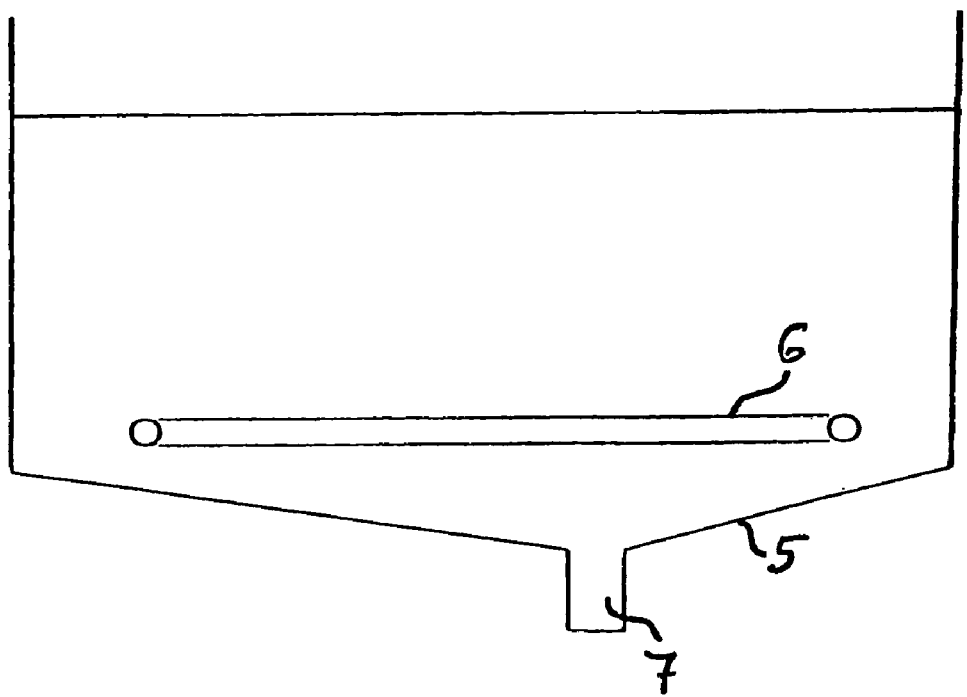
FIG. 3 is a schematic drawing of another embodiment of the frying vessel according to the invention.

The embodiment shown in FIG. 3 is similar to the one shown in FIG. 2, but in this case funneled portion 5 is formed asymmetrically. The advantage of this embodiment is that on the area where the most fallen off fragments (crumbs) can be found, for example at the point of insertion of the basket, the greater inclination of the respective bottom part will contribute to gathering these fragments at the bottom.

In FIGS. 2 and 3 outlet 7 is formed at the bottommost point of the funneled portion 5. It is noted that a crumb bag may be placed at the bottommost point, and outlet 7 itself may be formed slightly above it.

Figure 4:
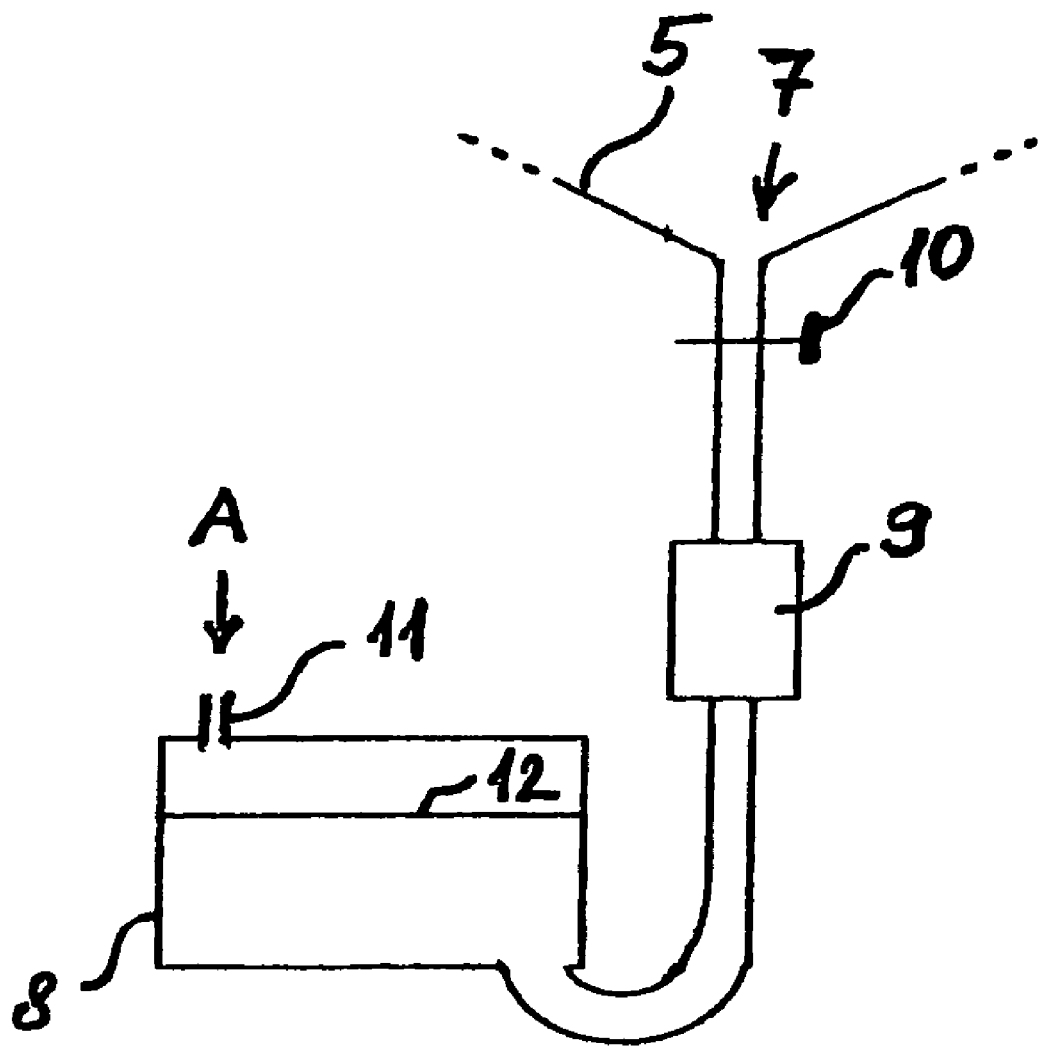
FIG. 4 is a schematic drawing of one embodiment of the drain tank according to the invention.

In FIG. 4 outlet 7 is provided with a stopcock 10. Under the stopcock 10 a filter 9 for filtering out the fragments (crumbs) is applied, which is removable and can be emptied. The vessel is in communication with a drain tank 8 through filter 9. Drain tank 8 can be hermetically closed and opened by means of one or more air ducts 11 (only one is shown in FIG. 4) which end in the closed space being above the filling level of oil 12 when the tank is filled with oil. Drain tank 8 should be located so that the aforementioned filling level of oil 12 of the tank is lowered in relation to the location of outlet 7, stopcock 10 and filter 9, thereby draining off the frying oil becomes possible in a simple manner due to gravitation when stopcock 10 is opened. It is possible to raise pressure in the tank higher than atmospheric pressure by introducing compressed air "A", by means of which filtered frying oil may be fed back to the frying vessel via the same route. To this, filter 9 should be removed beforehand or at least it should be emptied. The system then operates as a communicating vessel controlled by pressure, and the exhausted frying oil can be filled or drained off without the need of a pump. By circulating the oil in two directions and by blowing air from beneath through air duct 11, fragments which still get stuck can be broken up from the inclined bottom part, particularly from the part being in the vicinity of outlet 7.

The invention claimed is:

1. A deep fryer apparatus comprising a fryer vessel, the fryer vessel comprising side walls and a bottom, an electric heating element extending substantially horizontally in the fryer vessel for direct contact with frying oil, and an outlet opening in the bottom of the fryer vessel for draining off at least used frying oil, at least a portion of the bottom adjacent the outlet opening having, in at least one vertical plane, a funnel-shape which narrows toward the outlet opening, a collection vessel having side walls, a bottom, a top and an inlet opening communicating with a space above a predetermined flying oil level in the collection vessel which predetermined level is lower than the outlet opening of the fryer vessel, a filter in communication with the outlet opening of the fryer vessel and removably disposed therebeneath so as to receive and filter frying oil drained therefrom, and a conduit communicating between a downstream side of the filter and the collection vessel.

2. A deep fryer apparatus according to claim 1, further comprising a source of superatmospheric air or other gas communicating with the inlet opening of the collection vessel, the collection vessel otherwise being substantially hermetically closed, thereby to drive the filtered used frying oil, from the collection vessel to the fryer vessel.

3. A method of operating the apparatus of claim 2, comprising (a) draining used cooking oil from the fryer vessel by gravity through the filter and collecting the used cooking oil in the collection vessel, (b) when the used cooking oil has not reached a level in the collection vessel above said predetermined level, removing the filter or removing, cleaning and reinstalling the filter, and (c) supplying superatmospheric air or other gas from said source thereof to the collection vessel through the inlet opening thereof, thereby to recycle filtered used frying oil to the fryer vessel and dislodge particulate matter from the funnel-shaped portion of the fryer vessel.

* * * * *